E. WEERTS.
DOUBLE DISK FRICTION DRIVE MECHANISM.
APPLICATION FILED DEC. 24, 1909. RENEWED FEB. 7, 1911.
1,002,477.
Patented Sept. 5, 1911.
2 SHEETS—SHEET 1.
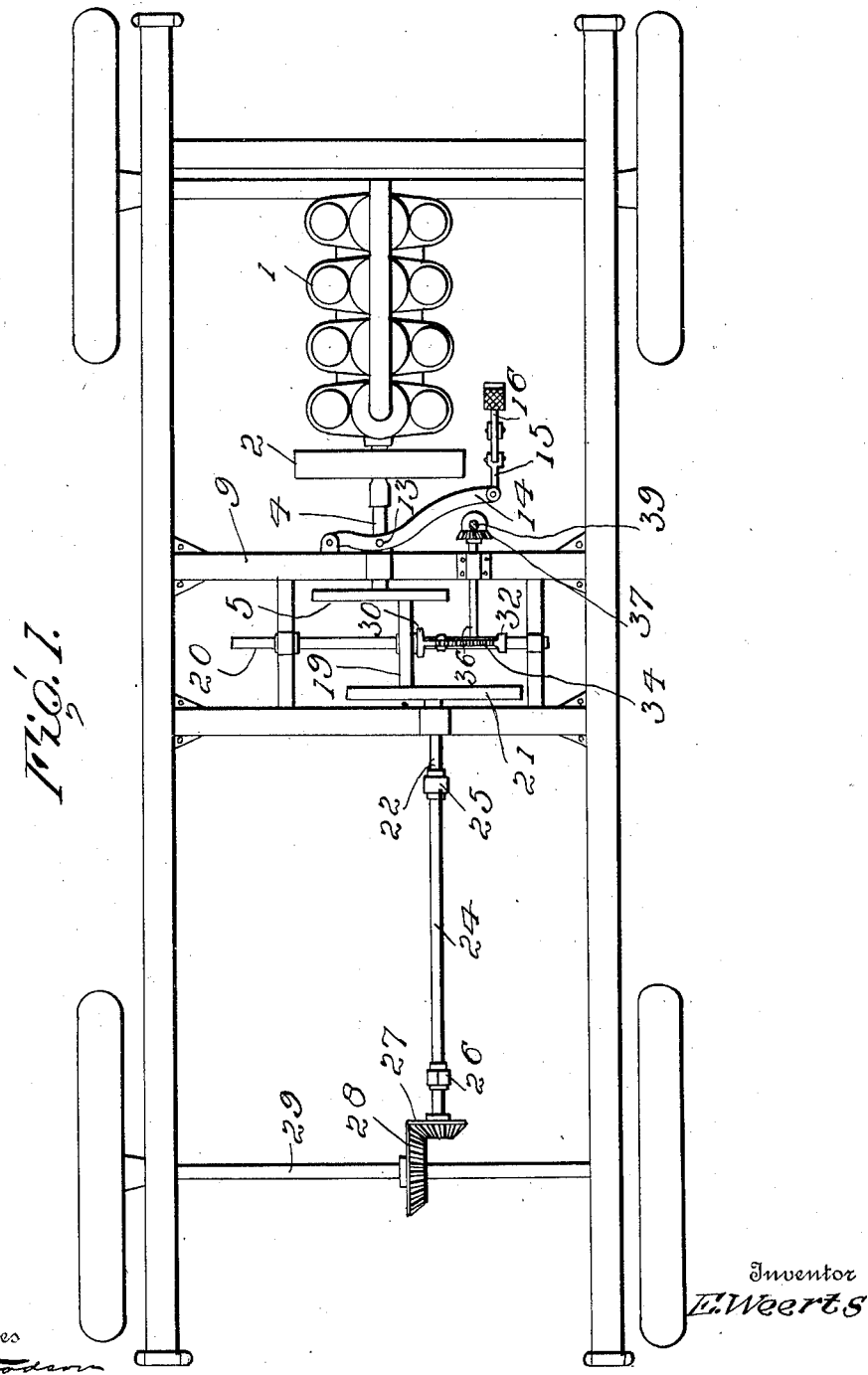

E. WEERTS.
DOUBLE DISK FRICTION DRIVE MECHANISM.
APPLICATION FILED DEC. 24, 1909. RENEWED FEB. 7, 1911.
1,002,477.
Patented Sept. 5, 1911.
2 SHEETS—SHEET 2.
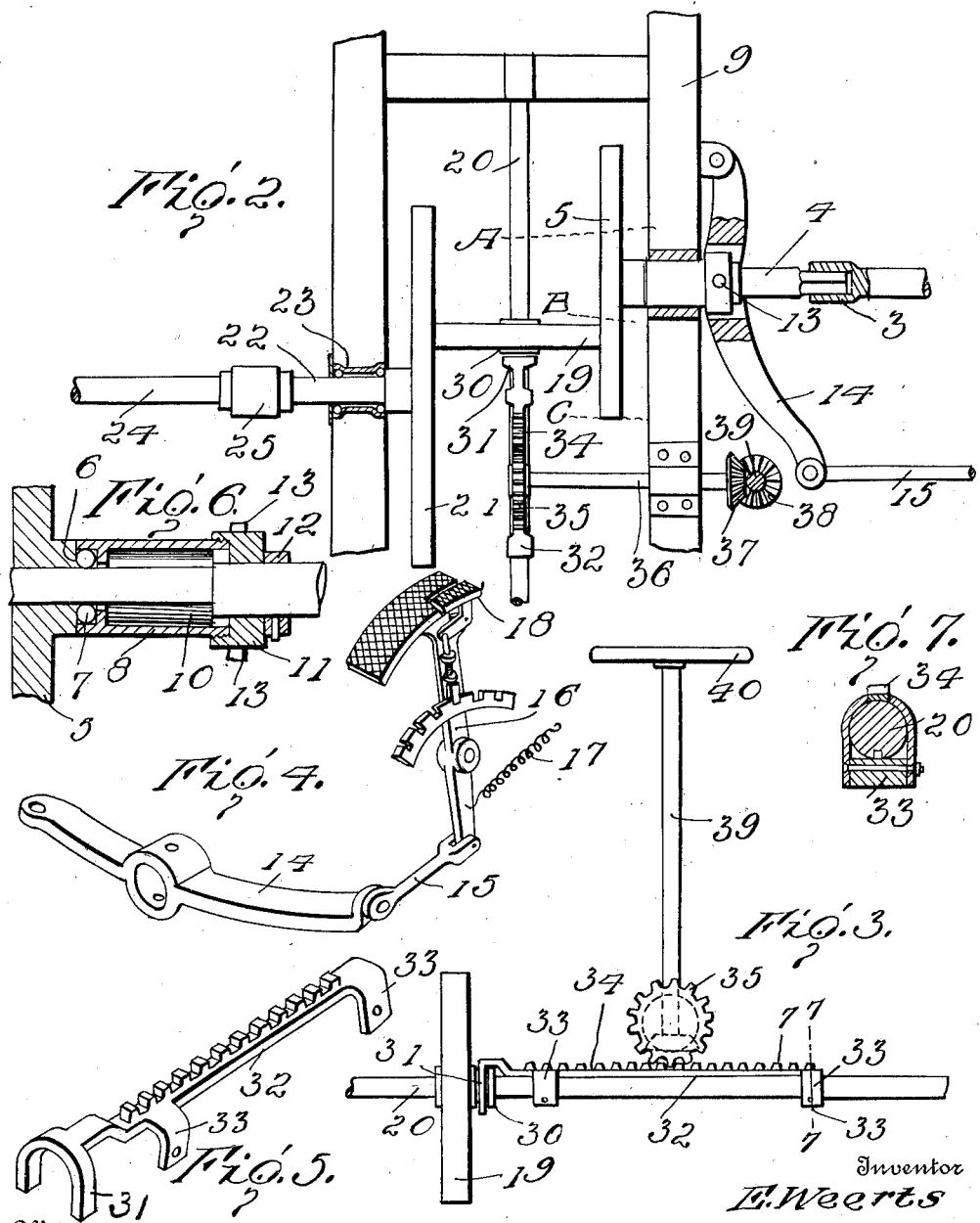

UNITED STATES PATENT OFFICE.

EILERT WEERTS, OF WENTWORTH, SOUTH DAKOTA.

DOUBLE-DISK FRICTION DRIVE MECHANISM.

1,002,477. Specification of Letters Patent. Patented Sept. 5, 1911.

Application filed December 24, 1909, Serial No. 534,799. Renewed February 7, 1911. Serial No. 607,165.

*To all whom it may concern:*

Be it known that I, EILERT WEERTS, citizen of the United States, residing at Wentworth, in the county of Lake and State of South Dakota, have invented certain new and useful Improvements in Double-Disk Friction Drive Mechanism, of which the following is a specification.

This invention comprehends certain new and useful improvements in a propelling mechanism or power transmission devices designed particularly for automobiles or other self propelled vehicles, although applicable to other uses, and the invention has for its primary object an improved construction of double friction drive mechanism which will be simple in construction and durable and easy to control, being composed of comparatively few parts that may be easily manufactured and readily assembled and disassembled. And the invention also has for its object, a friction drive mechanism of this character which will be silent and easy in running, all side play of the shafts being prevented.

The invention has for a further object, a friction drive mechanism in which all slipping of the friction wheels will be prevented, devices being provided whereby wear may be taken up at all times, and the parts held properly in contact and operative relation to each other. And the invention also has for its object, an improved construction and arrangement of parts whereby the speed may be easily controlled and the direction of the rotation of the drive shafts easily reversed, whereby the drive will be a direct shaft drive which is particularly advantageous and whereby the driver of the automobile for instance may easily control the speed and reverse the rotation of the drive shaft by the use of a single hand operated element.

With these and other objects in view, the invention consists in certain constructions, arrangements and combinations of the parts that I shall hereinafter fully describe and claim.

For a full understanding of the invention, reference is to be had to the following description and accompanying drawings in which:

Figure 1 is a top plan view of a double disk friction drive mechanism constructed in accordance with my invention; Fig. 2 is a similar view on a slightly larger scale, parts being shown in section, and other parts omitted. Fig. 3 is a detail elevation of a portion of the means for shifting the transmission disk laterally on its shaft; Fig. 4 is a detail perspective view of a shipper lever employed and the foot treadle for actuating it; Fig. 5 is a detail perspective view of the bar for shifting the transmission disk; Fig. 6 is a longitudinal sectional view of one of the shaft bearings; and, Fig. 7 is a detail transverse sectional view, the section being taken on the line 7—7 of Fig. 3.

Corresponding and like parts are referred to in the following description and indicated in all the views of the accompanying drawings by the same reference characters.

Referring to the drawings, the numeral 1 designates an engine or motor which may be of any desired size, type, or design, the same embodying a drive shaft on the rear end of which is the ordinary transversely disposed fly wheel 2, the fly wheel being formed with a non-circular and preferably square socket 3 designed to receive the adjacent end of a friction drive shaft 4 which is correspondingly formed and which is adapted for longitudinal movement in the socket, whereby the shaft 4 may be moved forwardly or backwardly to some extent without affecting the connection between it and the engine shaft which rotates the shaft 4 as the fly wheel 2 rotates.

The rear end of the shaft 4 carries a drive disk 5, at the hub portion of which and on the front face of which is formed a ball race 6 for antifriction balls 7. This portion of the shaft 4 is mounted to rotate in a journal bearing 8, which is held as against turning in any desired way as by splines or keys formed thereon, in a portion of the supporting framework 9. The rear end of this journal box 8 forms a race for the balls 7 and the interior of the box is designed to receive antifriction rollers 10. The front end of the box 8 is threaded, and a collar 11 is engaged with this threaded end, said collar serving to hold the rollers 10 in place and being in turn held in place as against unscrewing, by means of a set screw 12. The screw 11 is formed with upwardly and downwardly projecting pins 13 which are engaged by the yoke of a shipper lever 14 fulcrumed at one end on the framework 9 and mounted to swing about a substantially vertical axis. The free end of the lever 14 is connected by a link 15 to a foot treadle 16, the foot treadle being pulled rearwardly as by a spring 17 and being provided with a dog 18 by which it may be held in position when it is pushed forwardly by the foot of the operator or driver of the automobile. This dog or detent 18 may be easily released by the toe so as to permit the spring 17 to act to draw the upper end of the foot treadle 16 rearwardly. When the upper end of the foot treadle is pushed forwardly by the operator, it is obvious that it will swing the shipper lever 14 rearwardly and thereby move the shaft 4 rearwardly, so as to insure that the driving disk 5 will be held in frictional engagement with the laterally shiftable transmission disk 19 mounted loose on the transversely extending supporting shaft 20. The transmission disk 19 engages in addition to the face of the disk 5, the opposing face of a somewhat larger driven disk 21 which is secured to the forward end of a shaft 22 mounted in ball bearings in the framework 9 as indicated at 23. This shaft 22 practically forms part of the longitudinally extending transmission shaft 24 being connected thereto by a universal joint 25, and said shaft 24 being connected by a universal joint 26 the rear end of which carries a bevel pinion 27 meshing with a corresponding pinion 28 on the rear axle 29 of the vehicle. The disk 21 is offset from the disk 5 but is of such a diameter that its edge will extend beyond the center of the disk 5 whereby the transmission disk 19 may be used to control the direction of rotation of the shaft 24 as well as to vary the speed thereof. In order to shift the transmission disk 19, said disk is formed with a grooved collar 30, which is engaged by a yoke 31 formed on one end of a shipper bar 32 mounted to move longitudinally on the shaft 20 and held thereon by brackets 33 that have a spline connection with said shaft. The bar 32 is formed with rack teeth 34, and a spur pinion 35 meshes with the rack 34, said pinion being secured to the rear end of a longitudinally extending shaft 36 journaled in the framework 9. To the forward end of the shaft 36 a bevel pinion 37 is secured, said pinion meshing with a corresponding pinion 38 on the end of the actuating rod 39 which is provided at its upper end with a hand wheel 40, the latter being preferably arranged in convenient location to the ordinary steering wheel of the automobile, so that the operator may easily turn the shaft 39 and thereby shift the transmission disk 19 to the right or to the left. Obviously, the shifting of the disk 19 between the points indicated by the lines B and C of the drive disk will vary the forward speed of the vehicle, while the shifting of the transmission disk 19 between the points indicated by the lines B and A will reverse the direction of rotation of the shaft 24 and cause the vehicle to be moved rearwardly.

Having thus described the invention, what is claimed as new is:

1. The combination with a drive and driven shafts and friction disks secured to the respective shafts in spaced relation to each other, of a transmission disk located between both of the first-named disks and engaging the same, a transversely extending shaft on which said transmission disk is mounted for a movement in a direction lengthwise of the shaft, the transmission disk being freely rotatable on the shaft, a shipper bar provided at one end with a fork engaging the transmission disk and formed with brackets slidingly mounted on the last named shaft, the shipper bar being formed with a rack, a pinion meshing with said rack, a shaft to which the pinion is connected, a bevel pinion secured to the last named shaft, and a manually operable rotatable actuating rod provided with a bevel pinion meshing with the first-named bevel pinion.

2. In power transmission mechanism, the combination with drive and driven shafts and friction disks secured to the respective shafts in spaced relation to each other, the transmission disk engaging both of the first-named disks and located between them, a transversely extending shaft on which the transmission disk is movable in a direction lengthwise of said shaft, a shipper bar having a spline connection with the last named shaft and operatively connected to the transmission disk and formed with a rack, a pinion meshing with said rack, a shaft to which the pinion is connected, and manually operable means connected to said shaft for turning the same.

In testimony whereof I affix my signature in presence of two witnesses.

EILERT WEERTS. [L. S.]

Witnesses:
 A. E. FULLER,
 H. H. HOLDRIDGE.

---

Copies of this patent may be obtained for five cents each, by addressing the "Commissioner of Patents, Washington, D. C."